(12) United States Patent
Sirman et al.

(10) Patent No.: US 7,384,452 B2
(45) Date of Patent: Jun. 10, 2008

(54) FLUID HEATING METHOD

(75) Inventors: John Sirman, Bethlehem, CT (US);
Leonard H. Switzer, Corfu, NY (US);
Bart Antonie van Hassel, Amherst, NY (US); M. Mushtaq Ahmed, Pittsford, NY (US)

(73) Assignee: Praxair Technology, Inc., Danbury, CT (US)

( * ) Notice: Subject to any disclaimer, the term of this patent is extended or adjusted under 35 U.S.C. 154(b) by 433 days.

(21) Appl. No.: 11/297,328

(22) Filed: Dec. 9, 2005

(65) Prior Publication Data
US 2007/0134604 A1 Jun. 14, 2007

(51) Int. Cl.
*B01D 53/22* (2006.01)
*C01B 13/02* (2006.01)
*F23L 7/00* (2006.01)

(52) U.S. Cl. .................. 95/54; 431/2; 60/649
(58) Field of Classification Search .............. 95/54, 95/138; 431/2, 12; 60/649; 122/31.1
See application file for complete search history.

(56) References Cited

U.S. PATENT DOCUMENTS

| | | | |
|---|---|---|---|
| 5,837,125 A | 11/1998 | Prasad et al. ........ 205/763 |
| 6,149,714 A | 11/2000 | Kobayashi ............. 95/54 |
| 6,394,043 B1 | 5/2002 | Bool, III et al. ....... 122/488 |
| 6,539,719 B2 | 4/2003 | Prasad et al. .......... 60/649 |
| 6,562,104 B2 * | 5/2003 | Bool et al. ............ 95/54 |
| 2004/0002030 A1 * | 1/2004 | Shah et al. ............ 431/12 |

FOREIGN PATENT DOCUMENTS

EP 0658367 A2 * 6/1995

* cited by examiner

*Primary Examiner*—Frank M Lawrence
(74) *Attorney, Agent, or Firm*—David M. Rosenblum

(57) ABSTRACT

A method of heating a fluid utilizing a process heater having one or more first combustion zones and one or more second combustion zones. The combustion of a fuel is divided between the first and second combustion zones. The oxygen is provided for combustion within the first combustion zone by one or more oxygen transport membranes that contribute between about 60 and 99 percent of the stoichiometric amount of oxygen required for complete combustion of the fuel passing through the process heater. A supplemental or secondary oxidant is introduced into second combustion zone to complete combustion of the fuel and thereby produce a flue gas stream containing between about 1 and 3 percent oxygen to ensure complete combustion of the fuel. In this manner, the surface area of the oxygen transport membranes may be reduced below the surface area that otherwise would be required if 100 percent of the oxygen were contributed by the oxygen transport membranes.

17 Claims, 1 Drawing Sheet

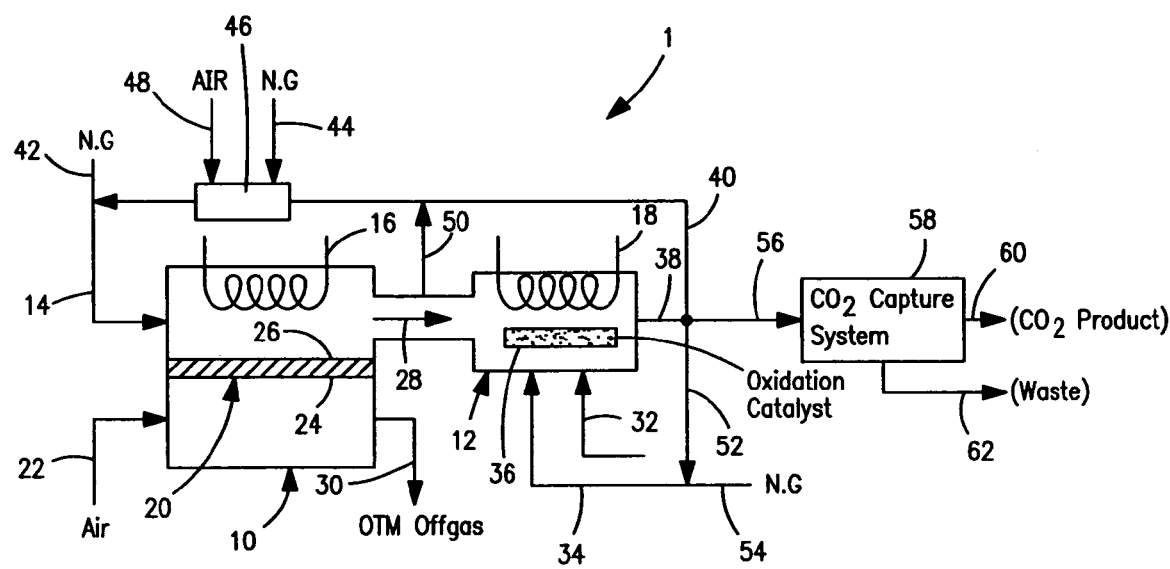

FLUID HEATING METHOD

FIELD OF THE INVENTION

The present invention relates to a method of heating a fluid. More particularly, the present invention relates to such a method in which the fluid is heated within a process heater incorporating an oxygen transport membrane to provide permeated oxygen to support combustion and thereby raise the heat necessary for heating the fluid. Even more particularly, the present invention is related to such a method in which the combustion of the fuel is divided between a first heating zone incorporating the oxygen transport membrane and a second heating zone in which a secondary oxidant is used to support the combustion.

BACKGROUND OF THE INVENTION

The prior art has provided process heaters to heat fluids. A common example of a process heater is a boiler that is used to either raise steam from feed water or to superheat steam that has already been generated. Typically, process heaters combust a fuel in the presence of an oxidant, for example, air, to raise the heat necessary to heat the process fluid. In recent years, it has been suggested to incorporate oxygen transport membranes in process heaters in order to produce permeated oxygen to support the combustion in place of air.

The major advantage of using an oxygen transport membrane in a process heater to supply oxygen for the combustion is that steam present within the flue gases resulting from the combustion can be condensed at a higher temperature than in flue gases produced by combustion supported by air alone. The reason for this is that when the combustion is supported by oxygen produced by the oxygen transport membrane, the flue gases essentially contain carbon dioxide and water. When air is used as the combustion oxidant, the flue gases also contain substantial amounts of nitrogen and the water contained in such flue gases will condense at a much lower temperature, typically about 25° C. lower than the case in which the combustion is supported by oxygen. The condensation of the steam at high temperature allows heat that would be otherwise lost in the stack gases to be recovered and recycled for use in preheating the feed to the process heater. As such, a process heater utilizing an oxygen transport membrane can be more thermally efficient than one using air. In addition to the foregoing, since the flue gases essentially contain water and carbon dioxide, the carbon dioxide can be easily sequestered through conventional removal of the water. Moreover, since only a small amount, if any, of nitrogen is present during the combustion, very little NOx is produced from the combustion.

As well known in the art, oxygen transport membranes can be fabricated from ceramics that are formed into plate or tubular elements that when heated to an operational temperature of between about 400° C. and about 1000° C. exhibit oxygen ion transport. When an oxygen containing gas, for instance, air, is contacted on one side of the membrane, known as the cathode side, the oxygen ionizes by gaining electrons. The resultant oxygen ions are transported through the membrane and emerge from an opposite side, known as the anode side, where the oxygen ions combine to form elemental oxygen and in so doing produce electrons. The electrons are transported back from the anode side to the cathode side to ionize the oxygen. If the ceramic material is a mixed conductor, typically a perovskite, the electrons will be transported in the ceramic material itself. Other types of materials use dual phases of an ionic material, such as ceria or yttria stabilized zirconia, that is capable of only transporting the oxygen ions and an electronically conductive phase. The electronically conducting phase is utilized to conduct the electrons. The transport of the oxygen ions is driven by an oxygen partial pressure differential between the cathode and anode sides of the membrane. This partial pressure difference can be created in whole or in part by consuming the oxygen at the anode side through combustion of a fuel.

There have been a variety of designs for process heaters incorporating oxygen transport membranes proposed in the prior art. Such example can be found in U.S. Pat. No. 6,394,043 that incorporates oxygen transport membranes within a combustion chamber to provide oxygen to support combustion of the fuel and thereby to generate heat. Part of the heat generated is used to heat the oxygen transport membrane to its operational temperature. The remaining portion of the heat is used to raise steam or to superheat steam passing through transfer passages extending through the combustion chamber. Flue gases produced from the combustion can be recirculated and mixed with the fuel. In another example, U.S. Pat. No. 6,562,104, a fuel is combusted within a combustion chamber and the heated flue gases are passed in a cross-flow relationship to oxygen transport membranes that are used to generate oxygen. In one embodiment, the oxygen transport membranes and steam tubes are interspersed within a combustion chamber. In another embodiment, the oxygen transport membranes and steam tubes are separated. A combustion chamber contains the steam tubes and the resultant flue gas is passed to the oxygen transport membranes as a sweep gas. The flue gases become enriched in oxygen and are then recirculated to the combustion chamber.

The problem of an oxy-fuel combustion system that utilizes oxygen transport membranes is that the oxygen flux in fuel rich conditions is substantially greater than in fuel lean conditions by an order of magnitude. Thus, in order to have complete combustion in such a system, a large membrane surface area is required to contribute the oxygen necessary for stoichiometric combustion. As will be discussed, the present invention provides a method of heating a fluid by a process heater having integrated oxygen transport membranes that overcomes this problem by not utilizing oxygen transport membranes as the sole source of the oxygen that is used to support the combustion.

SUMMARY OF THE INVENTION

The present invention provides a method of heating a fluid. In accordance with the method a fuel stream is introduced into a process heater having at least one first combustion zone and at least one second combustion zone for combustion of fuel contained in the fuel stream. Heat transfer passages extend through the at least one first combustion zone for passage of the fluid to be heated from heat generated from combustion of the fuel. The at least one first combustion zone and the at least one second combustion zone are connected in series so that a first portion of the fuel is able to be combusted in the at least one first combustion zone and a second portion of the fuel not combusted in the at least one first combustion zone is able to be combusted in the at least one second combustion zone.

The fuel stream is contacted with at least one oxygen transport membrane located within the at least one first combustion zone. Oxygen is separated from the at least one first oxygen containing gas stream with the at least one oxygen transport membrane such that permeated oxygen supports the combustion of a first portion of the fuel and supplies between about 50 percent and about 99 percent of the amount of stoichiometric oxygen necessary for complete combustion of the fuel present within the at least one first combustion zone. Combustion of the first portion of the fuel provides a driving force for the separation of the oxygen. At least one second oxygen containing gas stream is introduced into the at least one second of the combustion zones to support combustion of the second part of the fuel so that a flue gas is produced from the combustion of the second part of the fuel containing between about 1 and about 3 percent by volume of oxygen. The flue gas is discharged from the at least one second combustion zone.

A process heater that utilizes the oxygen transport membranes in a manner in which not all of the oxygen necessary for the combustion is contributed by the oxygen transport membranes allows the number of oxygen transport membranes to be substantially reduced making the use of oxygen transport membranes for oxy-fuel combustion economically attractive. Preferably, the permeated oxygen supplies between about 75 percent and about 95 percent of the amount of stoichiometric oxygen necessary for complete combustion of fuel present within the at least one first combustion zone. The at least one second oxygen containing gas stream can be air or oxygen enriched air or an oxygen containing stream containing at least 90 percent by volume of oxygen. Such an oxygen containing stream can be produced by pressure swing adsorption or cryogenic rectification. While the use of pressure swing adsorption or cryogenic rectification is on an economic basis counterintuitive in that there would be expense associated with obtaining oxygen from such sources, the use of such sources of oxygen in the practice of the present invention, particularly in cases in which most of the fuel is consumed in the first combustion zone, can be economically attractive in that very little oxygen would be required to be contributed from such sources.

A flue gas stream composed of part of the flue gas can be also introduced into the at least one first combustion zone. The use of the flue gas in the at least one first combustion zone recaptures the heat of combustion and also increases the steam to carbon ratio to help prevent carbon deposition on the oxygen transport membrane. Another flue gas stream composed of another part of the flue gas can be introduced into the at least one second combustion zone. Additionally, another fuel stream is introduced into the at least one second combustion zone. The flue gas stream being introduced into the at least one first combustion zone can be heated in an in-line combustor. A further possibility is to withdraw an intermediate flue gas stream between the at least one first combustion zone and the at least one second combustion zone and combining the intermediate flue gas stream with the flue gas stream being recirculated to the at least one first combustion zone. The intermediate flue gas stream is formed from combustion gases produced in the at least one first combustion zone.

Any embodiment of the present invention could incorporate an oxidation catalyst contained in the at least one second of the combustion zone to promote combustion of the second portion of the fuel.

BRIEF DESCRIPTION OF THE DRAWING

While the specification concludes with claims distinctly pointing out the subject matter that Applicants regard as their invention, it is believed that the invention will be better understood when taken in connection with the accompanying drawing in which the sole figure is a schematic of an apparatus for performing a method in accordance with the present invention.

DETAILED DESCRIPTION

With reference to FIG. 1 a process heater 1 is illustrated that for purposes of discussion is a boiler designed to heat water or to superheat steam. As would be known by those skilled in the art, process heaters could be used to heat other fluids, for example reactants such as steam and a hydrocarbon containing feed to a steam methane reformer. In this regard, the term "process heater" as used herein and in the claims is any device which through combustion of a fuel indirectly heats any fluid passing through heat exchange passes located in the process heater.

Process heater 1 is provided with a first combustion zone 10 and a second combustion zone 12 that is designed to burn fuel provided by a combined stream 14 to completion. In the illustrated embodiment, the fuel provided is natural gas ("N.G."). The total heat generated is used to heat process fluid, e.g. water passing through heat exchange passages 16 located in first combustion zone 10 and optionally in heat exchange passages 18 located in second combustion zone 12. The heat generated from the combustion of the fuel supplies the heat to the process fluid passing through the transfer passages 16 and 18.

An oxygen transport membrane 20 is located within first combustion zone 10. Oxygen transport membrane 20 could be fabricated from known perovskites or a dual-phase conductor having an ionic phase for the transport of oxygen ions and an electronic phase for the passage of electrons. A typical ionic conductor would be ceria or yttrium stabilized zirconia. Additionally, although only a single oxygen transport membrane 20 is illustrated, as would be known to those skilled in the art and as shown in the prior art discussed above, a series of oxygen transport membranes could project into first combustion zone 10.

A primary oxygen containing stream 22, for instance air is introduced into first combustion zone 10 to contact a cathode side 24 of oxygen transport membrane 20. Oxygen is separated from the primary oxygen containing stream 22 to produce permeated oxygen at an anode side 26 of oxygen transport membrane 20 through oxygen ion transport. The oxygen ion transport is driven by combustion of part of the fuel that is injected from combined stream 14 into combustion zone 10 and also, part of the heat generated is used to raise oxygen transport membrane 20 to operational temperatures.

As will be discussed, the first portion of the fuel is combusted within first combustion zone 10 to leave a second portion of the fuel and combustion products to be injected as a stream 28 into second combustion zone 12. Stream 28 contains combustion gases produced by the combustion occurring in first combustion zone 10 and unburned fuel. The separation of the oxygen from oxygen containing gas 22 produces an oxygen transport membrane off gas stream 30 that in the case of air is rich in nitrogen. Typically, the operating temperature of oxygen transport membrane 20 is approximately between about 800° C. and about 1000° C. It is to be noted that while first and second combustion zones 10 and 12 are illustrated as being separate and apart from one another, such combustion zones could actually be part of the same combustion zones. In such case, the second combustion zone 12 would simply be located downstream, with respect to combustion gases and unburned fuel, from the first combustion zone 10.

As discussed above, oxygen transport membrane 20 has a sufficient area supplying anywhere from between about 50 and about 99 percent of the stoichiometric amount of oxygen required to completely combust the fuel within the fuel stream 14. Preferably, oxygen transport membrane 20 supplies between about 75 percent and about 95 percent of such stoichiometric amount of oxygen. As such, stream 28 still contains unburned fuel and, as will be discussed, the area savings for oxygen transport membrane 20 significant under such circumstances.

The actual calculation of the required membrane surface area is determined by the transfer of oxygen through an oxygen transport membrane. Any such calculation is a complicated modeling process with many intermediate steps that need to be considered, such as: mass transfer across the gas phase boundary layers surrounding the oxygen transport membrane; airside surface exchange; ambipolar diffusion; oxidation of the fuel; and the mass transfer of fuel through the porous support of the membrane. The effect of temperature, pressure and gas composition on some of these intermediate steps is not well understood. Models developed for a particular membrane architecture will not be universally applicable. However, such modeling is well within those skilled in the art.

Thus, although modeling is possible, the following is a more direct and simple method for determining such area. An oxygen transport membrane, such as oxygen transport membrane 20, is exposed at high temperature and fuel on the anode side and to the oxygen containing stream on the cathode side. These process streams can flow in co-current, counter-current or in cross flow directions with respect to one another. The degree of fuel combustion is determined from the difference between the inlet and outlet gas composition and the flow rates on the fuel or anode side of the oxygen transport membrane. The average oxygen flux is computed by dividing the amount of oxygen per unit of time that has been removed from the oxygen containing stream by the membrane area that was used in the experiment. When flow rates of the fuel and the oxygen containing stream are experimentally varied, the average oxygen flux as a function of the degree of fuel combustion and the degree of oxygen recovery from the air stream can be determined. This determination will be limited for that particular membrane material utilized, membrane architecture, flow configuration, temperature and pressure. The average oxygen flux value can then be used for estimating the membrane area requirement for the amount of stoichiometric oxygen to be supplied by dividing the total oxygen requirement per unit of time by the average oxygen flux.

The following Tables I, II and II show examples of an average oxygen flux calculation from simulated results involving varying degrees of combustion and for membrane areas of about 780.4 cm$^2$.

TABLE I

High degree of combustion (95%):

| Mole fraction | Fuel | | Air | |
| --- | --- | --- | --- | --- |
| | In | Out | In | Out |
| H2 | 0.010 | 0.000 | | |
| H2O | 0.370 | 0.651 | | |
| CO | 0.010 | 0.000 | | |

TABLE I-continued

High degree of combustion (95%):

| Mole fraction | Fuel | | Air | |
| --- | --- | --- | --- | --- |
| | In | Out | In | Out |
| CO2 | 0.190 | 0.331 | | |
| CH4 | 0.410 | 0.012 | | |
| N2 | 0.010 | 0.006 | 0.791 | 0.939 |
| O2 | 0.000 | 0.000 | 0.209 | 0.061 |
| Flow rate [slpm] | 3 | 5.337 | 15 | 12.634 |
| Degree of fuel combustion [%] | 95% | | | |
| Oxygen recovery [%] | | | 75% | |
| Average oxygen flux [sccm/cm2] | | | 3.03 | |

TABLE II

Medium degree of combustion (79%):

| Mole fraction | Fuel | | Air | |
| --- | --- | --- | --- | --- |
| | In | Out | In | Out |
| H2 | 0.010 | 0 | | |
| H2O | 0.370 | 0.623 | | |
| CO | 0.010 | 0.002 | | |
| CO2 | 0.190 | 0.316 | | |
| CH4 | 0.410 | 0.052 | | |
| N2 | 0.010 | 0.006 | 0.791 | 0.939 |
| O2 | 0.000 | 0.000 | 0.209 | 0.061 |
| Flow rate [slpm] | 6 | 9.89 | 25 | 21.06 |
| Degree of fuel combustion [%] | 79% | | | |
| Oxygen recovery [%] | | | 75% | |
| Average oxygen flux [sccm/cm2] | | | 5.05 | |

TABLE III

Low degree of fuel combustion (66%):

| Mole fraction | Fuel | | Air | |
| --- | --- | --- | --- | --- |
| | In | Out | In | Out |
| H2 | 0.010 | 0.001 | | |
| H2O | 0.370 | 0.597 | | |
| CO | 0.010 | 0.003 | | |
| CO2 | 0.190 | 0.303 | | |
| CH4 | 0.410 | 0.091 | | |
| N2 | 0.010 | 0.006 | 0.791 | 0.939 |
| O2 | 0.000 | 0.000 | 0.209 | 0.061 |
| Flow rate [slpm] | 9 | 13.859 | 35 | 30.074 |
| Degree of fuel combustion [%] | 66% | | | |
| Oxygen recovery [%] | | | 75% | |
| Average oxygen flux [sccm/cm2] | | | 7.02 | |

In, these tables there exists calculated quantities of the degree of fuel combustion, oxygen recovery and average oxygen flux on a unit basis. These quantities are determined as follows:

The degree of fuel combustion ($\eta$ as %) can be computed from the Tables as follows:

$$\eta = \frac{F_{fuel,in}\left(\frac{1}{2}xH_{2,in} + \frac{1}{2}xCO_{in} + 2xCH_{4,in}\right) - F_{fluegas,out}\left(\frac{1}{2}xH_{2,out} + \frac{1}{2}xCO_{out} + 2xCH_{4,out}\right)}{F_{fuel,in}\left(\frac{1}{2}xH_{2,in} + \frac{1}{2}xCO_{in} + 2xCH_{4,in}\right)} * 100$$

Where:

$F_{fuel,in}$=molar flow rate of fuel stream entering the process heater [mol/s]

$xH_{2,in}$=mole fraction of hydrogen in the fuel [-]

$xCO_{in}$=mole fraction of carbon monoxide in the fuel [-]

$xCH_{4,in}$=mole fraction of methane in the fuel [-]

$F_{fluegas,out}$=molar flow rate of flue gas stream leaving the OTM section of the boiler [mol/s]

$xH_{2,out}$=mole fraction of hydrogen in the flue gas [-]

$xCO_{out}$=mole fraction of carbon monoxide in the flue gas [-]

$xCH_{4,out}$=mole fraction of methane in the flue gas [-]

The oxygen recovery ($R_{O2}$ as %) can be computed from Table 1 as follows:

$$R_{O_2} = \frac{F_{air,in}xO_{2,in} - F_{retentate\,out}xO_{2,out}}{F_{air,in}xO_{2,in}} * 100$$

Where:

$F_{air,in}$=molar flow rate of oxygen containing stream entering the process heater [mol/s]

$xO_{2,in}$=mole fraction of oxygen in the oxygen containing gas stream [-]

$F_{retentate,out}$=molar flow rate of the oxygen depleted stream [mol/s]

$xO_{2,out}$=mole fraction of oxygen in the oxygen depleted stream [-]

The average oxygen flux ($J_{O2}$ in mol $O_2/m^2/s$) results from the following equation:

$$\frac{F_{air,in}xO_{2,in} - F_{retentate\,out}xO_{2,out}}{A}$$

Where:

A=Oxygen transport membrane area [$m^2$]

The oxygen transport membrane area that is required for a process heater can then be computed by dividing the required amount of oxygen for fuel combustion determined by a stoichiometric proportion by the experimental value of the average oxygen flux that has been determined in the manner set forth above for the same degree of combustion, oxygen recovery, and other process conditions (e.g. temperature, pressure, fuel, composition of the oxygen containing stream and flow rates). For example, assuming hydrogen where the fuel and a degree of fuel combustion of 50 percent were required, the amount of oxygen required for such purpose would be half the amount of fuel required. The flow rate of required oxygen would then be divided by the experimental value of the average flux "$J_{O2}$" as determined above to determine the requisite area.

If Tables I, II and III are reviewed, it can be seen that as the degree of combustion increases the flux per unit area decreases. This is because, as mentioned above, that more area is required for higher degrees of combustion but the driving force along the length of the membrane is decreasing to result in lower value of flux per unit area.

Turning back to the illustrated embodiment, stream 28 is introduced into second combustion zone 12 along with a secondary oxygen containing gas stream 32 to supply the additional oxygen required to completely combust the fuel remaining in stream 28. When a load is placed in the second combustion zone 12 such as heat exchange passages 18, an additional fuel stream 34 may also be introduced into second combustion zone 12 to meet the heating requirements for the load. This, however, is optional as are heat exchange passages 18. In situations in which the combustion occurring within first combustion zone 10 is near stoichiometric, it may be difficult to combust the fuel remaining within stream 28 within second combustion zone 12. In such cases, an oxidation catalyst 36 can be provided to promote the reaction of the fuel with the oxygen contained within the oxygen containing gas stream 32. Oxidation catalyst 36 can be any of numerous such catalysts that are well known in the art and that could consist of a perovskite oxide. It is necessary that sufficient oxygen, by way of second oxygen containing gas stream 32, is supplied such that a flue gas stream 38 is discharged from second combustion zone 12 that contains anywhere from about 1 percent to about 3 percent by volume of oxygen. This ensures that the fuel delivered by combined stream 14 and optionally, a combined stream 34 containing fuel have been completely combusted.

The secondary oxygen containing gas stream 32 can be air. This is the least expensive proposition and would be practical at high stoichiometric oxygen rates within first combustion zone 10. Thus, very little nitrogen is contributed and flue gas stream 38 contains a sufficiently low concentration of nitrogen than water contained within flue gas stream 38 is able to be condensed at a higher temperature than would be the case had the oxidant been conventionally supplied by air throughout the process heater. As will also be discussed, other sources of oxidant could be used such as those generated by pressure swing adsorption or even cryogenic distillation. The amount of oxygen that would be required would be quite small and such units could be extremely compact and therefore be economically justifiable. The exact cutoff point of course is an economic one that depends on the price of the oxygen contained within secondary oxygen containing gas stream 32. In any case, secondary oxygen containing gas stream 32 preferably has an oxygen concentration of at least about 90 percent by volume and hence, could be oxygen enriched air.

A first portion 40 of flue gas stream 38 can be recirculated as a recirculation stream combined with a fuel stream 42 to form combined stream 14. It is possible to separately inject fuel stream 42 and first portion 40 of flue gas stream 38 into first combustion zone 10. The use of recirculated flue gas is optional, but advantageous, in that it preheats fuel stream 14 and also supplies steam to prevent carbon deposition on oxygen transport membrane 20 by increasing the steam to carbon ratio of the combustion. Optionally, fuel stream 44 can be combusted within an in-line combustor 46, for example, a duct burner. Combustion within in-line combustor 46 is supported by a tertiary oxygen containing gas stream 48, for example air. Optionally, an intermediate flue gas stream 50 formed from part of stream 28 can be added to the flue gas recirculation stream to also combust part of the fuel. The advantage of this is to achieve a higher flow rate to promote higher mass transfer and more uniform temperature distributions. A yet further option is to provide a second portion 52 from flue gas stream 38 to supply heat to second combustion zone 12. As mentioned above, combined stream 34 can be produced by combining a fuel stream 54 with second portion 52 of flue gas stream 38. Fuel stream 54 and second portion 52 of flue gas stream 38 could be separately injected.

A flue gas stream 56 is then introduced into a carbon dioxide capture system 58 to produce a carbon dioxide product 60 for sequestration in a waste stream 62 that principally would consists of water. Carbon dioxide capture system 58 consists of a phase separator, compressor and intercoolers utilized in a manner well known in the art. Flue gas stream 56 could consist of the entire amount of flue gas stream 38 or the remainder after providing first and second portions 40 and 52 of flue gas stream 38.

As can be appreciated several combustion zones, such as combustion zone 10 could be utilized in a larger installation. This would allow the heating of heat exchange passages 16 to be more uniform. In such an installation, although not illustrated, not all of the fuel stream 14 would be introduced into an initial of the first combustion zones, rather, the fuel would be staged to the first combustion zones so that the heat generated was equal. Additionally, more than one second combustion zones, such as combustion zone 12 could be provided. For instance, in a case in which only 50 percent of the fuel were combusted in first combustion zone 10, sufficient fuel would exist to superheat steam and at first of the second combustion zones 12 and then in a downstream combustion zone 12, steam could be raised from feed water. Although also not illustrated, downstream heat exchangers could be provided to reduce the temperature of flue gas stream 38.

The following Table IV illustrates calculated examples to show the effect on the reduction in the area of the oxygen transport membrane or membranes used in first combustion zone 10 with the use of fuel rich, sub-stoichiometric combustion occurring within first combustion zone 10 followed by the addition of supplemental oxygen by way of secondary oxygen containing gas stream 32. The system considered here is for a heat input of 120 MM BTU/hour burning natural gas (equivalent to a boiler producing about 100,000 lb/h saturated steam). The oxygen transport membrane or membranes is assumed to be operating between about 850° C. and about 1000° C. The base case was generated by assuming that the oxygen flux from the oxygen transport membrane 20 was constant in a beginning section of the furnace, in which there is an excess of fuel. Once all of the fuel was consumed, it was assumed that the oxygen flux decreased substantially and since there is no more fuel, the oxygen transport membrane would operate in a similar manner to the patents mentioned above in which the combustion products act as a sweep gas. Further assumptions used in generating the table are that: (a) the oxygen transport membranes supply 100 percent of stoichiometric oxygen; (b) the oxygen beyond the stoichiometric requirement is supplied by direct oxidant injection of secondary oxygen such as illustrated above by secondary oxygen containing gas stream 32; (c) the oxygen flux is constant at 10 sccm/cm$^2$-min; and (d) The oxygen flux is constant at 0.5 sccm/cm$^2$-min when excess oxygen is present by injection of the secondary oxygen.

TABLE IV

| $O_2$ in flue (% wet) | Reduction in OTM area (%) | Additional Oxidant Choices | | |
|---|---|---|---|---|
| | | Tons/day of >99.9% $O_2$ | Tons/day of 92% Purity $O_2$ (VPSA) | Air (scfm) |
| 1.0 | 19 | 4.1 | 4.4 | 320 |
| 2.0 | 28 | 8.2 | 8.9 | 650 |
| 3.0 | 32 | 12.4 | 13.5 | 980 |

Table V illustrates further calculated examples and is analogous to Table IV, but shows the effect of changing the amount of the total oxygen replaced in the system by direct injection. The base case for Table V is the same as Table IV (all oxygen is supplied by oxygen ion transport through one or more membranes). In these cases, the assumptions are: (a) Excess oxygen in the flue gas is 1 percent (wet); (b) Oxygen up to the given percentage of total required relative to the base case (column 1) is supplied through oxygen ion transport; (c) Remaining stoichiometric as well as excess oxygen supplied by direct injection of a secondary oxygen; (d) The oxygen flux is constant at 10 sccm/cm$^2$-min in the combustion zone; and (e) The oxygen flux is constant at 0.5 sccm/cm$^2$-min when excess $O_2$ is present.

TABLE V

| $O_2$ supplied by OTM (% wet) | Reduction in OTM area (%) | % $O_2$ in the flue (wet) | Additional Oxidant Choices | | |
|---|---|---|---|---|---|
| | | | Tons/day of >99.9% $O_2$ | Tons/day of 92% Purity $O_2$ (VPSA) | Air (scfm) |
| 95 | 20 | 1 | 13.5 | 14.7 | 1060 |
| 90 | 23 | 1 | 27.1 | 29.4 | 2140 |
| 80 | 28 | 1 | 54.1 | 58.8 | 4270 |

While the invention has been described with reference to a preferred embodiment, as will occur to those skilled in the art, numerous, changes, additions and omissions may be made without departing from the spirit and scope of the present invention as recited in the presently pending claims.

We claim:

1. A method of heating a fluid comprising:

introducing a fuel stream into a process heater having at least one first combustion zone and at least one second combustion zone for combustion of fuel contained in the fuel stream and heat transfer passages extending through the at least one first combustion zone for passage of the fluid to be heated from heat generated from the combustion of the fuel;

the at least one first combustion zone and the at least one second combustion zone being connected in series so that a first portion of the fuel is able to be combusted in the at least one first combustion zone and a second portion of the fuel not combusted in the at least one first combustion zone is able to be combusted in the at least one second combustion zone;

contacting the fuel stream with at least one oxygen transport membrane located in the at least one first combustion zone and separating oxygen from at least one first oxygen containing gas stream with the at least one oxygen transport membrane such that permeated oxygen supports the combustion of the first portion of the fuel and supplies between about 50 percent and about 99 percent of an amount of stoichiometric oxygen necessary for complete combustion of the fuel present within the at least one first combustion zone and the combustion of the first portion of the fuel provides a driving force for the separation of the oxygen;

introducing at least one second oxygen containing gas stream into the at least one second of the combustion zones to support combustion of the second part of the fuel so that a flue gas is produced from the combustion of the second part of the fuel containing between about 1 and about 3 percent by volume of oxygen; and discharging the flue gas from the at least one second combustion zone.

2. The method of claim 1, wherein the permeated oxygen supplies between about 75 percent and about 95 percent of an amount of stoichiometric oxygen necessary for complete combustion of the fuel present within the at least one first combustion zone.

3. The method of claim 1 or claim 2, wherein the at least one second oxygen containing gas stream is air or oxygen enriched air or an oxygen containing stream containing at least 90 percent oxygen by volume.

4. The method of claim 1, wherein the heat transfer passages also extend through the at least one second combustion zone.

5. The method of claim 1, wherein a flue gas stream composed of part of the flue gas is also introduced into the at least one first combustion zone.

6. The method of claim 5, wherein another flue gas stream composed of another part of the flue gas is introduced into the at least one second combustion zone.

7. The method of claim 6, wherein another fuel stream is introduced into the at least one second combustion zone.

8. The method of claim 6, wherein the flue gas stream is heated in an in-line combustor.

9. The method of claim 6, further comprising withdrawing an intermediate flue gas stream between the at least one first combustion zone and the at least one second combustion zone, the intermediate flue gas stream being formed from combustion gases produced in the at least one first combustion zone, and combining the intermediate flue gas stream with the flue gas stream being recirculated to the at least one first combustion zone.

10. The method of claim 1, wherein the at least one second of the combustion zones contains an oxidation catalyst to promote combustion of the second portion of the fuel.

11. The method of claim 3, wherein the heat transfer passages also extend through the at least one second combustion zone.

12. The method of claim 11, wherein a flue gas stream composed of part of the flue gas is also introduced into the at least one first combustion zone.

13. The method of claim 12, wherein the flue gas stream is heated in an in-line combustor.

14. The method of claim 13, further comprising withdrawing an intermediate flue gas stream between the at least one first combustion zone and the at least one second combustion zone, the intermediate flue gas stream being formed from combustion gases produced in the at least one first combustion zone, and combining the intermediate flue gas stream with the flue gas stream being recirculated to the at least one first combustion zone.

15. The method of claim 14, wherein another flue gas stream composed of another part of the flue gas is introduced into the at least one second combustion zone.

16. The method of claim 15, wherein another fuel stream is introduced into the at least one second combustion zone.

17. The method of claim 15, wherein the at least one second of the combustion zones contains an oxidation catalyst to promote combustion of the second portion of the fuel.

* * * * *